United States Patent [19]

Koepke et al.

[11] Patent Number: 4,871,445
[45] Date of Patent: Oct. 3, 1989

[54] HYDROCARBON CONVERSION

[75] Inventors: Jeffery W. Koepke, La Habra; Suheil F. Abdo, Diamond Bar, both of Calif.

[73] Assignee: Union Oil Company of California, Los Angeles, Calif.

[21] Appl. No.: 243,709

[22] Filed: Sep. 13, 1988

Related U.S. Application Data

[62] Division of Ser. No. 880,312, Jun. 30, 1986, Pat. No. 4,777,157.

[51] Int. Cl.$^4$ .................. C10G 47/20; C10G 65/12
[52] U.S. Cl. ..................... 208/89; 208/111; 208/112
[58] Field of Search ............. 208/111, 112, 89, 46, 208/254 H, 216 R, 217; 502/354

[56] References Cited

U.S. PATENT DOCUMENTS

| | | | |
|---|---|---|---|
| 2,124,584 | 7/1938 | Morrell et al. | 208/121 |
| 3,140,322 | 7/1964 | Frilette et al. | 260/667 |
| 3,165,463 | 1/1965 | Gleim et al. | 208/264 |
| 3,592,760 | 7/1971 | Young | 208/111 |
| 3,875,081 | 4/1975 | Young | 252/455 Z |
| 4,036,737 | 7/1977 | Wristers et al. | 208/108 |
| 4,192,735 | 3/1980 | Aldridge et al. | 208/112 |
| 4,233,139 | 11/1980 | Murrell et al. | 208/112 |
| 4,269,737 | 5/1981 | Grenoble et al. | 252/464 |
| 4,310,440 | 1/1982 | Wilson et al. | 502/208 |
| 4,419,222 | 12/1983 | Grenoble et al. | 208/111 |
| 4,431,748 | 2/1984 | Klotz | 502/256 |
| 4,447,556 | 5/1984 | O'Hara et al. | 208/111 |
| 4,514,516 | 4/1985 | Puskas | 502/202 |
| 4,777,157 | 10/1988 | Koepke et al. | 502/74 |

FOREIGN PATENT DOCUMENTS

| | | | |
|---|---|---|---|
| 0147991 | 7/1985 | European Pat. Off. | 502/214 |
| 0178723 | 4/1986 | European Pat. Off. | 502/64 |

*Primary Examiner*—Anthony McFarlane
*Attorney, Agent, or Firm*—Alan H. Thompson; Gregory F. Wirzbicki

[57] ABSTRACT

A hydrocracking process, of especial use in producing high octane gasoline from gas oils and the like, comprises contacting a gas oil or other hydrocarbon feedstock under hydrocracking conditions with a novel catalyst comprising at least one niobium component and a support material comprising a cracking component.

32 Claims, No Drawings

HYDROCARBON CONVERSION

This application is a division, of application Ser. No. 880,312, filed June 30, 1986, now U.S. Pat. No. 4,77,157.

BACKGROUND OF THE INVENTION

This invention relates to a catalytic hydrocracking process and a catalyst for use therein. More particularly, the invention relates to a hydrocracking catalyst of improved properties for producing gasoline from gas oils and the like under hydrocracking conditions.

Petroleum refiners often produce desirable products such as turbine fuel, diesel fuel, middle distillate (or midbarrel) products, as well as lower boiling products, such as naphtha and gasoline, by hydrocracking a hydrocarbon feedstock derived from a crude oil. Feedstocks most often subjected to hydrocracking are gas oils recovered as a fraction from a crude oil by distillation. The typical gas oil comprises a substantial proportion of hydrocarbon components boiling above about 400° F., usually at least about 60% by weight boiling above about 500° F.

Hydrocracking is generally accomplished by contacting, in an appropriate reactor vessel, the gas oil or other feedstock to be treated with a suitable hydrocracking catalyst under suitable conditions of elevated temperature and pressure in the presence of hydrogen so as to yield a product containing a distribution of hydrocarbon products required by (or satisfactory to) the refiner. Although the operating conditions within a hydrocracking reactor are of obvious importance in influencing the yield of product or products, the hydrocracking catalyst is of vital importance in this regard. Many catalysts are known for hydrocracking, but since their respective catalytic properties vary widely, it can be appreciated that hydrocracking catalysts having great usefulness for one purpose, as for example, for maximizing gasoline and naphtha production, are unsuitable for many other purposes, as for example, maximizing the yield of turbine fuel. And even among catalysts useful for producing the same product, the usefulness of each varies according to the requirements Of the refiner. For example, hydrocracking catalysts having high activity for maximum gasoline production under typical hydrocracking conditions have proven inferior for more specific purposes, as for example, where a relatively large yield of gasoline of improved octane quality is desired.

Oftentimes refiners have resorted to using catalysts at relatively severe hydrocracking conditions to obtain sufficient yields of high octane quality gasoline. Also, gasoline octane quality has traditionally been improved with the addition of lead compounds to gasoline; however, recent enviormental legislation has restricted such lead addition to the extent that refiners are searching for improved hydrocracking catalysts and processes in order to produce gasoline of high octane, thus obviating or minimizing the subsequent addition of octane improvers.

Accordingly, the present invention is directed to a novel catalyst and catalytic hydrocracking process primarily of advantage in producing a relatively high yield of gasoline of improved octane quality.

It is a major object of the invention to provide a catalytic hydrocracking process utilizing a novel hydrocracking catalyst of superior properties for producing a relatively high yield of gasoline of improved octane quality from gas oils and the like. A more specific object of the invention is to provide an improved catalyst for use in a catalytic hydrocracking process for treating hydrocarbon feedstocks boiling primarily above 400° F. so as to produce a light and a heavy gasoline fraction of improved octane quality These and other objects of the invention will become more apparent in view of the following description of the invention taken together with the Example.

SUMMARY OF THE INVENTION

In accordance with the process of the invention, it has now been found that a hydrocarbon gasoline stream of increased octane number can be recovered from the effluent of a hydrocracking zone by contacting a hydrocarbon feedstock with a novel catalyst containing a niobium component and a cracking component. Usually the catalyst further contains hydrogenation component(s), generally selected from Group VIB and Group VIII metals. Preferred cracking components are crystalline molecular sieves that are acidic forms of Y zeolites.

DETAILED DESCRIPTION OF THE INVENTION

The present invention provides for a catalyst useful in the production of a high yield of light and heavy gasoline fractions of improved octane quality. The catalyst contains at least one niobium component combined with at least one cracking component. Preferably the catalyst further contains at least one Group VIII metal component. As will be shown hereinafter in the Example, the niobium component utilized in the present invention proves highly superior for imparting octane boosting properties to the resulting catalyst as compared to essentially the same catalyst not containing niobium or a sufficient amount thereof.

The catalyst of the invention comprises a cracking component having sufficient acidity to impart activity for cracking a hydrocarbon oil. Suitable cracking components include silica-aluminas and crystalline molecular sieves having cracking activity. Crystalline molecular sieves are preferred cracking components. The term "crystalline molecular sieve" as used herein refers to any crystalline cracking component capable of separating atoms or molecules based on their respective dimensions. Crystalline molecular sieves may be zeolitic or nonzeolitic. The term "nonzeolitic" as used herein refers to molecular sieves whose frameworks are not formed of substantially only silica and alumina tetrahedra. The term "zeolitic" as used herein refers to molecular sieves whose frameworks are formed of substantially only silica and alumina tetrahedra such as the framework present in ZSM-5 type zeolites, Y zeolites, and X zeolites. Examples of zeolitic crystalline molecular sieves which can be used as a cracking component of the catalyst include Y zeolite, fluorided Y zeolites, X zeolites, zeolite beta, zeolite L, mordenite and zeolite omega. Examples of nonzeolitic crystalline molecular sieves which may be used as a cracking component of the catalyst include silicoaluminophosphates, aluminophosphates, ferrosilicates, titanium aluminosilicates, borosilicates and chromosilicates.

The most preferred zeolitic crystalline molecular sieves are crystalline aluminosilicate Y zeolites. U.S. Pat. No. 3,130,007, the disclosure of which is hereby incorporated by reference in its entirety, describes Y-type zeolites having an overall silica-to-alumina mole ratio between about 3.0 and about 6.0, with a typical Y zeolite having an overall silica-to-alumina mole ratio of about 5.0. It is also known that Y-type zeolites can be produced, normally by dealumination, having an overall silica-to-alumina mole ratio above 6.0. Thus, for purposes of this invention, a Y zeolite is one having the characteristic crystal structure of a Y zeolite, as indicated by the essential X-ray powder diffraction pattern of Y zeolite, and an overall silica-to-alumina mole ratio above 3.0, and includes Y-type zeolites having an overall silica-to-alumina mole ratio above about 6.0.

Typical Y zeolites in the sodium (or other alkali metal) form have few or no acid sites and, thus, have little or no cracking activity. The acidity of the Y zeolite may be increased by exchanging the sodium in the Y zeolite with ammonium ions, polyvalent metal cations, such as rare earth-containing cations, magnesium cations or calcium cations, or a combination of both, thereby lowering the sodium content. Such an ion-exchange may reduce the stability of the Y zeolite and (typically in the case of ammonium exchanges) the Y zeolite is then steam-treated at a high temperature (i.e., about 600° C. to about 800° C.) followed by further ion-exchange. For sufficient cracking activity, the sodium (or other alkali metal) content of the Y zeolite is generally reduced to less than about 1.0 weight percent, preferably less than about 0.5 weight percent and most preferably less than about 0.3 weight percent, calculated as $Na_2O$. Methods of carrying out the ion exchange are well known in the art.

A preferred Y zeolite is one prepared by first ammonium exchanging a Y zeolite to a sodium content between about 0.6 and 5 weight percent, calculated as $Na_2O$, calcining the ammonium exchanged zeolite in the presence of at least 0.2 p.s.i. water vapor partial pressure at a temperature between 600° F. and 1,650° F. to reduce the unit cell size to a value in the range between 24.40 and 24.64 Angstroms, and then ammonium exchanging the zeolite once again to replace at least 25 percent of the residual sodium ions and obtain a zeolite product of less than 1.0 weight percent sodium and preferably less than 0.6 weight percent sodium, calculated as $Na_2O$. Such a zeolite product is then calcined in contact with sufficient water vapor and for a sufficient time such that the unit cell size of the zeolite is reduced to between about 24.25 and 24.35 angstroms and the water adsorption capacity of the zeolite, at 4.6 mm water vapor partial pressure and 25° C., is less than 8 percent by weight of the zeolite. Such a Y zeolite is highly stable and maintains a high activity. The zeolite is described in detail in U.S. Pat. No. 3,929,672, the disclosure of which is hereby incorporated by reference in its entirety. A preferred member of this group is known as Y-82, a zeolitic aluminosilicate molecular sieve available from the Linde Division of the Union Carbide Corporation.

Another group of Y zeolites which may be used as a molecular sieve in the catalyst of the invention is comprised of zeolites normally having an overall silica-to-alumina mole ratio above about 6.0, preferably between about 6.1 and about 15. The zeolites of this group are prepared by dealuminating a Y-type zeolite having an overall silica-to-alumina mole ratio below about 6.0 and are described in detail in U.S. Pat. No. 4,503,023 issued to Breck et al., European Patent Application No. 84104815.0 published on Nov. 7, 1984 as Publication No. 0 124 120 by Best et al., and U.S. Pat. Application Ser. No. 793,566 filed on Oct. 31, 1985, the disclosures of which are hereby incorporated by reference in their entireties. A preferred member of this group is known as LZ-210, a zeolitic aluminosilicate molecular sieve available from the Linde Division of the Union Carbide Corporation. LZ-210 zeolites and the other zeolites of this group are conveniently prepared from a Y zeolite starting material in overall silica-alumina mole ratios between about 6.0 and about 15, although higher ratios are possible. Preferred LZ-210 zeolites have an overall silica-to-alumina mole ratio of about 6.1 to about 13.0. Typically, the unit cell size is at or below 24.65 Angstroms and will normally range between about 24.20 and about 24.65 Angstroms. LZ-210 zeolites having an over-all silica-to-alumina mole ratio below 20 generally have a sorptive capacity for water vapor at 25° C. and 4.6 mm mercury water vapor partial pressure of at least 20 weight percent based on the anhydrous weight of the zeolite. Normally, the oxygen sorptive capacity at 100 mm mercury and $-183°$ C. will be at least 25 weight percent. The LZ-210 class of zeolites have a composition expressed in terms of mole ratios of oxides as:

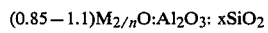

$(0.85 - 1.1)M_{2/n}O:Al_2O_3: xSiO_2$ wherein "M" is a cation having the valence "n" and "x" has a value greater than 6.0.

In general, LZ-210 zeolites may be prepared by dealuminating Y-type zeolites using an aqueous solution of a fluorosilicate salt, preferably a solution of ammonium hexafluorosilicate. The dealumination is accomplished by placing a Y zeolite, normally an ammonium exchanged Y zeolite, into an aqueous reaction medium such as an aqueous solution of ammonium acetate, and slowly adding an aqueous solution of ammonium fluorosilicate. After the reaction is allowed to proceed, a zeolite having an increased overall silica-to-alumina mole ratio is produced. The magnitude of the increase is dependent at least in part on the amount of fluorosilicate solution contacted with the zeolite and on the reaction time allowed. Normally, a reaction time of between about 10 and about 24 hours is sufficient for equilibrium to be achieved. The resulting solid product, which may be separated from the aqueous reaction medium by conventional filtration techniques, is a form of LZ-210 zeolite. In some cases this product may be subjected to a steam calcination by contacting the product with water vapor at a partial pressure of at least 0.2 p.s.i.a. for a period of between about ¼ to about 3 hours at a temperature between about 900° F. and about 1,500° F. in order to provide greater crystalline stability.

In addition to the zeolitic crystalline molecular sieves disclosed herein and used in the Example, other examples of cracking components that may be composited with niobium include non-crystalline acidic materials such as the silica-aluminas described in U.S. Pat. No. 4,097,365, the disclosure of which is incorporated by reference in its entirety.

An example of non-zeolite crystalline molecular sieves also useful as a cracking component in the composition of the invention is a silicoaluminophosphate, known by the acronym "SAPO," described in detail in U.S. Pat. No. 4,440,871, the disclosure of which is hereby incorporated by reference in its entirety. Another useful class of nonzeolitic crystalline molecular sieves is generally referred to as crystalline aluminophosphates, designated by the acronym "AlPO₄. "The structure and preparation of the various species of aluminophosphates are discussed in U.S. Pat. Nos 4,310,440 and 4,473,663, the disclosures of which are hereby incorporated by reference in their entirety. Yet another class of nonzeolitic molecular sieves suitable for use is known as ferrosilicates, designated by the acronym "FeSO." A preferred ferrosilicate denominated as FeSO-38 is disclosed in European Patent Application No. 83220068.0 filed on Oct. 12, 1982 and published on May 16, 1984 as Publication No. 0 108 271 A2, the disclosure of which application is hereby incorporated by reference in its entirety. Still other examples of nonzeolitic sieves include borosilicates, chromosilicates and crystalline silicas. Borosilicates are described in U.S. Pat. Nos. 4,254,247, 4,264,813 and 4,327,236, the disclosures of which are hereby incorporated by reference in their entireties. Chromosilicates are described in detail in U.S. Pat. No. 4,405,502, the disclosure of which is also hereby incorporated by reference in its entirety. A preferred crystalline silica, essentially free of aluminum and other Group IIIA metals, is a silica polymorph, i.e., silicalite, which may be prepared by methods described in U.S. Pat. No. 4,061,724, the disclosure of which is hereby incorporated by reference in its entirety.

The cracking component may be combined with a binder or matrix material comprising a porous, inorganic refractory oxide component having essentially no cracking activity To prepare a catalyst, the cracking component is combined with the porous, inorganic refractory oxide component, or a precursor thereof, such as alumina, silica, titania, magnesia, zirconia, borilia, silica-alumina, silica-magnesia, silica-titania, other such combinations and the like, with alumina being the most highly preferred. Examples of precursors that may be used include peptized hydrogels, and silica sols. Normally, the porous, inorganic refractory oxide component or its precursor is mixed or comulled with a cracking component in amounts such that the final dry catalyst mixture will comprise (1) between about 2.5 weight percent and about 80 weight percent cracking component, preferably between about 15 weight percent and about 80 weight percent, and (2) between about 10 weight percent and about 90 weight percent of porous, inorganic refractory oxide, preferably between about 50 weight percent and about 70 weight percent. The comulled mixture is then formed into particulates, usually by extrusion through a die having openings of a cross sectional size and shape desired in the final catalyst particles. For example, the die may have openings therein in the shape of three-leaf clovers so in FIGS. 8 and 8A of U.S. Patent No. 4,028,227, the disclosure of which is hereby incorporated by reference in its entirety. Among preferred shapes for the die openings are those that result in particles having surface-to-volume ratios greater than about 100 reciprocal inches. After extrusion, the catalyst particles are cut into lengths of from 1/16 to ½ inch. The resulting particles are subjected to a calcination at an elevated temperature, normally between about 600° F. and about 1600° F., to produce catalytic particles of high crushing strength.

The catalyst of the invention contains at least one niobium component, such as the oxides or sulfides thereof, and and typically in an amount form about 1 to about 40 weight percent, preferably about 2 to about 20 weight percent, calculated as $Nb_2O_5$. The catalyst usually also contains one or more hydrogenation components, in particular, the metals, oxides and sulfides of the Group VIII and Group VIB elements. The most suitable hydrogenation components are selected from the group consisting of the metals, oxides and sulfides of platinum, palladium, cobalt, nickel, tungsten and molybdenum, with the latter four being most preferred. Non-noble Group VIII metals are usually employed in proportions between about 2 and 10 weight percent, calculated as the monoxide, and the Group VIB metals in a proportion between about 3 and 30 weight percent, calculated as the trioxide. When the hydrogenation component consists essentially of noble metal components, the hydrogenation component is usually present in proportions sufficient to ensure that the catalyst contains between about 0.05 and about 10 weight percent of the hydrogenation component, preferably between about 0.10 weight percent and about 3.0 weight percent, calculated as the metal.

As will be shown hereinafter in the Example, comparisons with nickel-niobium and nickel-niobiummolybdenum catalysts indicate that the best octane improvements occur in the absence of molybdenum. On the other hand, the best activity occurs when molybdenum is present. Present indications are that tungsten functions, like molybdenum, to increase activity, but it is believed that tungsten will not have the disadvantages of molybdenum, that is, tungsten in combination with a non-noble Group VIII metal will provide both high activity and significant octane improvement. Nevertheless, at present, the best results insofar as octane improvement is concerned have been with catalysts containing Group VIII metals as hydrogenation components and no Group VIB metals. Accordingly, the most presently preferred catalyst for this purpose comprises niobium on a support comprising a cracking component in combination with a hydrogenation component consisting essentially of Group VIII components. Furthermore, when Group VIB metals are present, the catalyst preferably contains at least an equal weight percent, and more preferably, a greater weight percent of niobium components, calculated as the pentoxide, than that of the Group VIB components, calculated as the trioxide.

Although niobium components may be supplied from essentially any source of niobium, suitable inorganic niobium compounds for use herein include niobium pentachloride, niobium pentafluoride, niobium dioxyfluoride ($NbO_2F$), niobium oxytrifluoride ($NbOF_3$), niobium oxyhalides such as $NbOC_1$, $NbOBr_3$, and $NbO_2I$, niobium oxynitrates such as $NbO_2NO_3$ and $NbO(NO_3)_3$, niobium boride ($NbB_2$), niobium carbide (NbC), niobium nitride (NbN), niobium sulfide ($NbS_2$), niobium oxalate $NbO(HC_2O_4)_3$ and niobium oxide ($NbS_2O_5$), with the latter two being most highly preferred. Organometallic compounds may be utilized such as cyclopentadienyl or carbonyl niobium compounds.

The niobium or hydrogenation components may be impregnated into the extruded catalyst particles from a liquid solution containing the desired component in dissolved form; however, niobium is not incorporated into the finished catalyst by conventional ion-exchange procedures. Since a majority of the niobium compounds useful herein are only slightly soluble or essentially insoluble in liquids, the preferred method of compositing niobium with the cracking component is by mulling or comulling niobium compounds with the cracking components and binding materials. In a preferred embodiment, the niobium and/or hydrogenation components are composited with the cracking components in a substantially completely undissolved, finely divided form in the presence of an aqueous medium by a method described in U.S. Pat. No. 3,875,081, the disclosure of which is incorporated by reference in its entirety. Such a method, as well as others known in the art, produces a preferred catalyst wherein the niobium and hydrogenation components are deposited on the exterior surface of the cracking component.

A preferred method for introducing the niobium or hydrogenation component into the catalyst includes mixing an appropriate solid or liquid containing the desired metal component with the cracking components and materials to be extruded through the die prior to compositing the cracking component with the porous inorganic refactory oxide binding component.

The hydrogenation and niobium components, which will largely be present in their oxide forms after calcination in air, may be converted to their sulfide forms, if desired, by contact at elevated temperatures in a reducing gas atmosphere comprising hydrogen sulfide. Most commonly, the sulfiding is accomplished in situ, as by placing the catalyst in its oxide form in the reactor vessel wherein the hydrocracking reactions are to be performed and then passing a mixture of elevated temperature. Alternatively, the catalyst may carbon disulfide through the catalyst bed under conditions be placed in the reactor vessel and then contacted, under hydrocracking conditions and in the presence of a sulfur component, with the hydrocarbon feedstock to be catalytically converted to lower boiling hydrocarbons. The sulfur component may be an organosulfur component present in the feedstock, or it may be hydrogen sulfide added from an external source. Alternatively still, the hydrogen sulfide may accompany the feedstock itself, as would be the case, for example, if the hydrocracking operation is performed immediately after hydrotreating. These and other well-known methods for activating the catalyst by conversion to the sulfide form may be utilized in the invention.

The catalyst of the invention may be employed in any of several hydrocarbon conversion processes wherein catalytic composites containing active metals on a support material are known to be catalytically effective. Typical processes include dehydrogenation, desulfurization, hydrodesulfurization, oxidation, denitrogenation, demetallization, isomerization, hydrocracking, reforming, and the like. It is preferred that the catalyst contact a hydrocarbon feedstock in the presence of hydrogen.

The term "hydrocarbon conversion" refers to any reaction wherein a hydrocarbon compound changes chemical composition. As used herein, "hydrocarbon" refers to any compound which comprises hydrogen and carbon, and "hydrocarbon feedstock" or "hydrocarbon feed" refers to any charge stock which contains greater than about 90 weight percent carbon and hydrogen, calculated as the elements. Preferred hydrocarbon feedstocks are hydrocarbon oils. Hydrocarbon compounds converted by the process of the invention include all forms, such as aliphatic, cycloaliphatic, olefinic, aromatic—including alkaryl and arylalkyl aromatic compounds and derivatives thereof—in addition to organometallic, metallic, organonitrogen, and organosulfur compounds, particularly those found in conventional hydrocarbon oils.

The hydrocarbon conversion conditions employed to convert a hydrocarbon feedstock will vary widely depending upon the process in which the catalyst is used and the nature of the feed. Most usually, the catalyst is maintained as a fixed bed with the feedstock passing downwardly therethrough, and the reactor is generally operated under conditions including a temperature from about 50° F. to about 1,000° F., a pressure from atmospheric to about 4,000 p.s.i.g., and a space velocity of about 0.05 to about 25. 1 In the presence of hydrogen, the hydrocarbon feed contacts the catalyst under hydroprocessing conditions including a hydrogen recycle rate usually about 1,000 to about 15,000, and preferably about 3,000 to about 10,000 standard cubic feet per barrel (scf/bbl).

The catalyst of the invention is particularly useful for hydrocracking a hydrocarbon oil containing hydrocarbons and/or other organic materials to a product containing hydrocarbons and/or other organic materials of lower average boiling point and lower average molecular weight. The hydrocarbon oils that may be subjected to hydrocracking by the method of the invention include all mineral oils and synthetic oils (e.g., shale oil, tar sand products, etc.) and fractions thereof. Illustrative hydrocarbon oils include atmospheric gas oils, vacuum gas oils, deasphalted vacuum and atmospheric residua, hydrotreated residual oils, coker distillates, cycle oils, and catcracker distillates. A preferred hydrocracking feedstock is a gas oil or other hydrocarbon fraction having at least 50% by weight, and most usually at least 80% by weight, of its components boiling at temperatures above 500° F. The most useful gas oil feedstock will consist essentially of hydrocarbon components boiling above about 550° F. (that is, more than about 90 volume percent boils above 550° F.) while the heavier gas oils will boil essentially completely above 700° F., with those gas oils having an end boiling point above about 950° F. and usually between 1,000° F. and 1,300° F. being specifically contemplated for treatment in the hydrocracking process of the invention.

Also, included are petroleum distillates wherein at least 90 percent of the components boil in the range from about 300° F. to about 700° F., and waxy raffinates or waxy distillates boiling above about 80° F., usually in the range from about 200° F. to about 1050° F. The petroleum distillates may be treated to produce both light gasoline fractions (boiling range, for example, from about 50° F. to about 185° F.) and heavy gasoline fractions (boiling range, for example, from about 185° F. to about 400° F.).

The process of the invention is most preferably utilized in conjunction with a catalytic hydrotreating operation. That is, the feedstock to be subjected to hydrocracking in the process of the invention most usually comprises, and more usually still consists essentially of, the entire effluent from a catalytic hydrotreater wherein, in the presence of a hydrotreating catalyst usually comprising Group VIII and VIB metal components on a porous non-cracking refractory oxide, such as a sulfided catalyst containing nickel and/or cobalt components plus molybdenum and/or tungsten components on alumina, the sulfur and nitrogen components in a hydrocarbon-containing liquid are converted by reaction with hydrogen at elevated temperatures and pressures to hydrogen sulfide and ammonia, respectively. In the preferred method of operation, therefore, hydrotreating will precede hydrocracking, and thus, the feedstock most usually subjected to hydrocracking in the process of the present invention will be a hydrotreated feedstock, such as a hydrotreated gas oil or a hydrotreated cycle oil. Such a hydrotreated feedstock typically contains organonitrogen compounds in a concentration less than about 500 ppmw, usually less than 100 ppmw, and preferably less than about 10 ppmw, calculated as N, and contains organosulfur compounds in a concentration less than about 100 ppmw, usually less than 10 ppmw, and preferably less than 1 ppmw, calculated as S.

Although all or a portion of the effluent from a hydrocarbon-containing stream passed through a hydrotreating zone is passed through a hydrocracking zone containing the catalyst of the invention, the process of the invention is not limited to this particular flow scheme. For example, in another embodiment of the invention, two separate hydrocracking zones may be utilized in series in one rector, or in two or more reactors, with one zone containing the catalyst of the invention and the other(s) containing the same or a different hydrocracking catalyst. Because of the combined presence of niobium and the cracking component in one of the catalysts, octane numbers of both light gasoline and heavy gasoline fractions are increased in the products obtained from a hydrocarbon feed that passes through the reactor.

In the process of the invention, the hydrocracking conditions are adjusted so as to obtain a substantial degree of cracking per pass of hydrocarbon feed over the catalyst. Usually, the cracking per pass is such as to convert a significant portion, ordinarily at least 30% by volume, preferably at least 35% by volume, of the hydrocarbon-containing components boiling above about 420° F. to hydrocarbon products boiling below about 420° F. Under preferred cracking conditions, and with a typical gas oil, the product distribution is such that, of the products boiling in the range of $C_4$ hydrocarbons to about 420° F., the gasoline product boiling between 50° F. and the end point of a typical light gasoline fraction (i.e., about 185° F.) comprises a substantial proportion, while the gasoline product boiling between about 185° F. and the end point of a typical heavy gasoline fraction (i.e., about 400° F.) comprises a lesser, yet also substantial proportion.

The exact conditions, of course, required to produce a desired result in any given hydrocracking process will depend primarily on the feedstock and the desired product, with the boiling point characteristics of the feedstock and desired product being particularly important factors in determining the conditions of operation. In general, however, the conditions of operation for hydrocracking gas oil feedstocks and the like in the process of the invention will fall into the following ranges:

TABLE I

|  | Suitable | Preferred |
| --- | --- | --- |
| Temperature, °F. | 400–950 | 650–900 |
| Pressure, p.s.i.g. | 500–3500 | 1000–3000 |
| LHSV | 0.1–10.0 | 0.5–3.0 |
| $H_2$/Oil, MSCF/bbl | 1–10 | 2–8 |

Although it is contemplated that the hydrocracking process of the invention may be carried out on a once-through basis, with collection of unconverted feed components, it is sometimes more desirable and preferable to operate with recycle of unconverted feed components boiling above the maximum desired product end point. Operation with recycle under ideal conditions converts the feedstock to extinction (i.e., a 100% conversion to products boiling below the maximum desired temperature of the product). More usually, however, one must operate with a bleed of unconverted feed components, resulting in a conversion over 90% but not quite to extinction.

One of the advantages of the catalyst of the invention is that its properties allow a petroleum refiner a certain degree of flexibility when operating under hydrocracking conditions. Where some hydrocracking catalysts are primarily designed for the maximum production of gasoline products under relatively severe conditions, the present catalyst under relatively moderate conditions (relative to the feedstock involved) has properties most advantageously utilized to produce a relatively high yield of a light gasoline fraction having high octane quality plus a significant yield of a heavy gasoline fraction also having high octane quality. And if the occasion demands, the operating conditions may be adjusted for maximizing the light gasoline production or heavy gasoline production, depending on the feedstock involved Thus, the invention provides for a "flexible" gasoline hydrocracking catalyst, which is of most advantageous use in those situations wherein a relatively high yield of light gasoline products having improved octane quality is primarily desired, but wherein it will occasionally be necessary to shift to maximum heavy gasoline production for short periods of time.

The invention is further illustrated by the following examples which are illustrative of specific modes of practicing the invention and are not intended as limiting the scope of the invention defined by the appended claims.

EXAMPLE

A number of catalysts are individually activity-tested according to the following method. A blend of hydrotreated and partially hydrocracked gas oil having the chemical and physical properties shown in the following Table II:

TABLE II

| Distillation Vol. % | °F. | | |
| --- | --- | --- | --- |
| IBP/5 | 325/406 | Gravity, °API | 38.5 |
| 10/20 | 410/425 | Sulfur, XRF, wt. % | 0.1 |
| 30/40 | 468/500 | Nitrogen, wt. % | 0.0001 |
| 50/60 | 532/561 | | |
| 70/80 | 591/623 | | |
| 90/95 | 665/705 | Total Aromatics, vol. % | 25.6 |
| EP/% Rec. | 768/98.9 | | | is passed in eight separate runs (runs 1 through 8) on a once-through basis through an isothermal reactor vessel containing a sample of catalyst particles. Operating conditions are as follows: 1.7 LHSV, 1,450 p.s.i.g., a once-through hydrogen flow of 8,000 scf/bbl, and a run length of approximately 10 days. The temperature of the reactor is adjusted in runs 5 through 8 to convert the feedstock to a product having an API gravity of 47.0° (i.e., about 40 volume percent conversion of feed components to products). In addition, tert-butyl amine and thiophene are added to the reactor in runs 5 through 8 in amounts commensurate with the amounts of $N_3H$ and $H_2S$, respectively, that would be present in the entire effluent from hydrotreating the gas oil blend from which the feedstock of Table II was derived, i.e., a gas oil containing about 0.5% by weight sulfur and 0.2 by weight of nitrogen. In runs 1 through 4, no tert-butyl amine is added to the reactor and the temperature is adjusted to convert the feedstock to a product having an API gravity of 49.5° (i.e., about 55 volume percent conversion of feed to product components). Thus, the conditions under which the catalysts are tested simulate those one would expect to pertain in a hydrocracking vessel employed in an integral hydrotreating-hydrocracking operation wherein the entire effluent from the hydrotreater, plus added hydrogen, is passed to the hydrocracker for further refinement. In this case, conversion is primarily to a light and heavy gasoline product. (In this simulation, the crack per pass in the hydrocracking zone itself, as stated above, is about 55 vol.% in runs 1 through 4 and 40 vol.% in runs 5 through 8; but the overall crack per pass through the integral hydrotreating-hydrocracking system, based on the unhydrotreated feedstock, is 60 vol. %).

The compositions of the catalysts tested in accordance with the foregoing procedure are specified in Table III. As shown, each of the catalysts (R, A, B and C) contains nickel plus molybdenum and/or niobium active components, and the supports of the catalysts contain the same proportion of one of two stabilized zeolites, one being LZ-210, a proprietary zeolite of Union Carbide, and the second, a stabilized Y zeolite prepared in accordance with the method of U.S. Pat. No. 3,929,672 herein incorporated by reference in its entirety. The two zeolites may be distinguished from each other at least by their water adsorption properties and their silica-to-alumina ratios. The stabilized Y zeolite, Y-82, is hydrophillic and has a silica-to-alumina mole ratio about 5.8. The LZ-210 zeolite has a silica-to-alumina mole ratio higher than that of Y-82, that is, about 9.0.

In addition to containing one of the two specified zeolites, the catalysts set forth in Table III are further composed of an alumina binder material.

Each of the foregoing catalysts, namely Catalysts R, A, B and C, is prepared by comulling the zeolites with an alumina hydrogel and nickel nitrate. In preparing Catalysts A, B and C of the invention, niobium pentoxide is also comulled with the other materials. Also, in preparing Catalysts R and B, ammonium heptamolybdate is comulled with the other materials. The comulled paste is extruded in particulate form having a cross-sectional cylindrical shape. The particulates are of a length between about ¼ and ½ inch, are dried and calcined in air, and sulfided prior to testing with a hydrogen sulfide-containing gas. The results obtained with each catalyst are shown in the following Table III.

invention) than run no. 5 (prior art Catalyst R). Also, the octane numbers of the heavy gasoline fraction are from 6 2 to 6.9 numbers higher in run no. 6 vs. run no. 5. Furthermore, when LZ-210 is used in Catalyst C, the octane numbers are improved even more significantly in run no. 8 vs. run no. 5, i.e., from 4.7 to 5.5 numbers higher than Catalyst R for light gasoline fractions and 6.5 to 10 numbers higher for heavy gasoline fractions.

The data from the runs also indicate that more niobium component than molybdenum component (calculated as $Nb_2O_5$ and $MoO_3$, respectively,) is needed in the catalyst of the invention to effect improved octane numbers for both light and heavy gasoline fractions. The octane numbers of the light and heavy gasoline fractions obtained from run no. 6 (containing Catalyst A) are consistently higher than those obtained from run no. 7 (containing Catalyst B), i.e., an improvement of 5.7 to 5.9 numbers for light gasoline fractions and 4.0 to 4.1 numbers for heavy gasoline fractions (run no. 6 vs. run no. 7). For run no. 3 vs. run no. 2, Catalyst A exhibits an improvement of 5.1 to 5.5 numbers for light gasoline fractions (vs. Catalyst B). Thus, the data obtained from the experiment of the Example indicate that, although Catalyst B of the invention is useful, Catalysts A and C of the invention are highly useful and superior for converting gas oil feedstocks and the like to light and heavy gasoline having higher octane numbers.

In view of the foregoing description of the invention including the Example thereof, it is evident that many alternatives, modifications, and variations can be made by those skilled in the art without departing from the concept of the present invention. Accordingly, it is intended in the invention to embrace all such alternatives, modifications, and variations as may fall within the scope of the appended claims.

We claim:

1. A hydrocracking process comprising catalyzing a hydrocracking reaction by contacting a hydrocarbon feedstock with a hydrocracking catalyst under hydrocracking conditions to produce a product hydrocarbon having an increased octane number than said hydrocarbon feedstock, wherein the hydrocracking catalyst consists essentially of at least one niobium component, at least one Group VIII metal component and at least one cracking component.

2. The process defined in claim 1 wherein said cracking component is a zeolitic crystalline molecular sieve selected from the group consisting of ZSM-5 zeolites, Y zeolites, X zeolites, zeolite beta, mordenite, zeolite L and zeolite omega.

TABLE III

| Run No./Cat. | Composition | | | | | Activity, °F.[1,2] | Light Gasoline[5] Octane Number | | Heavy Gasoline[6] Octane Number | |
| | Metals, wt. % | | | Support, wt. % | | | | | | |
| | NiO | $MoO_3$ | $Nb_2O_5$ | Alumina | Zeolite | | Research[3] | Motor[4] | Research[3] | Motor[4] |
| 1 Cat R | 5.0 | 15.0 | — | 20.0 | 60.0(Y-82) | 546 | 83.6 | 81.5 | 60.0 | 62.0 |
| 2 Cat A | 5.0 | — | 15.0 | 20.0 | 60.0(Y-82) | 584 | 85.9 | 84.5 | 61.5 | 64.4 |
| 3 Cat B | 5.0 | 7.5 | 7.5 | 20.0 | 60.0(Y-82) | 558 | 80.8 | 79.0 | 60.8 | 62.3 |
| 4 Cat C | 5.0 | — | 15.0 | 20.0 | 60.0(LZ-210) | 608 | 86.4 | 83.4 | 65.5 | 65.3 |
| 5 Cat R | 5.0 | 15.0 | — | 20.0 | 60.0(Y-82) | 704 | 81.1 | 79.2 | 58.2 | 60.5 |
| 6 Cat A | 5.0 | — | 15.0 | 20.0 | 60.0(Y-82) | 717 | 86.5 | 84.7 | 65.1 | 66.7 |
| 7 Cat B | 5.0 | 7.5 | 7.5 | 20.0 | 60.0(Y-82) | 710 | 80.6 | 79.0 | 61.0 | 62.7 |
| 8 Cat C | 5.0 | — | 15.0 | 20.0 | 60.0(LZ-210) | 729 | 86.6 | 83.9 | 68.2 | 67.0 |

[1]The activity data indicate the operating temp. after 100 hrs. of run for runs 1-4 to obtain a product having an API Gravity of 49.5°.
[2]The activity data indicate the operating temp. after 80 hrs. of run for runs 5-8 to obtain a product having an API Gravity of 47.0°.
[3]Octane numbers determined according to ASTM method D2699.
[4]Octane numbers determined according to ASTM method D2700.
[5]Light gasoline boiling range is 50° F. to 185° F.
[6]Heavy gasoline boiling range is 185° F. to 400° F.

The data obtained from the runs indicate that catalysts containing a niobium component, especially Catalysts A and C, exhibit a marked superiority in increasing the octane numbers of both light and heavy gasoline products obtained from the feedstock. For instance, the octane numbers of the light gasoline fraction are from 5.4 to 5.5 numbers higher in run no. 6 (Catalyst A of the 3. The process defined in claim 1 wherein said cracking component is a Y zeolite.

4. The process defined in claim 3 wherein said Y zeolite contains a mole ratio of oxides according to the formula $(0.85–1.1)M_{2/n}O:Al_2O_3:xSiO_2$ wherein M is a cation having the valence n and x has a value greater than 6.0.

5. The process defined in claim 4 wherein said Y zeolite is prepared by dealuminating a Y zeolite having an overall silica-to-alumina mole ratio below about 6.0 using an aqueous solution of a fluorosilicate salt.

6. The process defined in claim 3 wherein said Y zeolite is prepared by a method comprising the steps of:
   (1) calcining an ammonium-exchanged zeolite Y containing between about 0.6 and 5 weight percent sodium, calculated as $Na_2O$ at a temperature between about 600° and 1650° F. in contact with water vapor for a sufficient time to substantially reduce the unit cell size of said zeolite and bring it to a value between about 24.40 and 24.64 angstroms; and
   (2) subjecting the calcined zeolite to further ammonium ion exchange under conditions such that the sodium content of the zeolite is reduced below about 0.6 weight percent, calculated as $Na_2O$.

7. The process defined in claim 1 wherein said cracking component is a nonzeolitic crystalline molecular sieve selected from the group consisting of silicoaluminophosphates, aluminophosphates, ferrosilicates, borosilicates and chromosilicates.

8. The process defined in claim 1 wherein said composition contains: at least an equal weight percent of said niobium component, calculated as the pentoxide, as said Group VIB metal component, calculated as the trioxide.

9. A catalytic hydrocracking process comprising the step of contacting a hydrocarbon oil with a hydrocracking catalyst under hydrocracking conditions producing a product hydrocarbon of lower molecular weight and increased octane number than said hydrocarbon oil, said hydrocracking catalyst comprising at least one niobium component and at least one cracking component.

10. The process defined in claim 9 wherein said crystalline molecular sieve is a Y zeolite.

11. The process defined in claim 10 wherein said Y zeolite contains a mole ratio of oxides according to the formula $(0.85–1.1)M_{2/n}O:Al\ xSiO_2$ wherein M is a cation having the valence n and x has a value greater than 6.0.

12. The process defined in claim 11 wherein said Y zeolite is prepared by dealuminating a Y zeolite having an overall silica-to-alumina mole ratio below about 6.0 using an aqueous solution of a fluorosilicate salt.

13. The process defined in claim 10 wherein said Y zeolite is prepared by a method comprising the steps of:
   (1) calcining an ammonium-exchanged zeolite Y containing between about 0.6 and 5 weight percent sodium, calculated as $Na_2O$ at a temperature between about 600° and 650° F. in contact with water vapor for a sufficient time to substantially reduce the unit cell size of said zeolite and bring it to a value between about 24.40 and 24.64 angstroms; and
   (2) subjecting the calcined zeolite to further ammonium ion exchange under conditions such that the sodium content of the zeolite is reduced below about 0.6 weight percent, calculated as $Na_2O$.

14. The process defined in claim 9 wherein said crystalline molecular sieve is selected from the group consisting of Y zeolites, X zeolite, zeolite beta, mordenite, zeolite L, zeolite omega, ZSM-5 zeolites, silicoaluminophosphates, aluminophosphates, ferrosilicates, borosilicates and chromosilicates.

15. The process defined in claim 9 wherein said catalyst further comprising at least one Group VIB metal component.

16. The process defined in claim 15 wherein said catalyst further comprising cobalt or nickel metal components and said Group VIB metal components comprise molybdenum or tungsten metal components.

17. The process defined in claim 15 wherein said catalyst contains at least an equal weight percent of said niobium component, calculated as the pentoxide, as said Group VIB metal component, calculated as the trioxide.

18. The process defined in claim 9 wherein said product hydrocarbon comprises a gasoline fraction having a boiling range from about 50° F. to about 185° F.

19. The process defined in claim 9 wherein said product hydrocarbon comprises a gasoline fraction having a boiling range from about 185° F. to about 400° F.

20. The process defined in claim 18 wherein said gasoline fraction has a higher octane number than a similar gasoline fraction produced in the same process at essentially the same conditions using essentially the same hydrocracking catalyst prepared without niobium, said octane numbers determined by ASTM method D2699.

21. The process defined in claim 19 wherein said gasoline fraction has a higher octane number than a similar gasoline fraction produced in the same process at essentially the same conditions using essentially the same hydrocracking catalyst prepared without niobium, said octane numbers determined by ASTM method D2699.

22. The process defined in claim 18 wherein said gasoline fraction has a higher octane number than a similar gasoline fraction produced in the same process at essentially the same conditions using essentially the same hydrocracking catalyst prepared without niobium, said octane numbers determined by ASTM method D2700.

23. The process defined in claim 19 wherein said gasoline fraction has a higher octane number than a similar gasoline fraction produced in the same process at essentially the same conditions using essentially the same hydrocracking catalyst prepared without niobium, said octane numbers determined by ASTM method D2700.

24. A catalytic hydrocracking process comprising the step of contacting a hydrotreated feedstock with a hydrocracking catalyst under hydrocracking conditions including a temperature in the range from about 650° F. to about 900° F., a pressure in the range from about 1,000 p.s.i.g. to about 3,000 p.s.i.g. and a liquid hourly space velocity (LHSV) of about 0.5 to about 3.0, producing a product hydrocarbon of lower molecular weight and increased octane number than said feedstock, said hydrocracking catalyst comprising at least one niobium component, at least one cobalt or nickel component, at least one molybdenum or tungsten component and a cracking component selected from the group consisting of silica-alumina and crystalline molecular sieves.

25. The process defined in claim 24 wherein said hydrocracking catalyst comprises a greater weight percent of said niobium component, calculated as the pentoxide, than that of said molybdenum or tungsten component, calculated as the trioxide.

26. The process defined in claim 24 wherein said Y zeolite contains a mole ratio of oxides according to the formula $(0.85-1.1)M_{2/n}O:Al_2O_3:xSiO_2$ wherein M is a cation having the valence n and x has a value greater than 6.0.

27. The process defined in claim 26 wherein said Y zeolite is prepared by dealuminating a Y zeolite having an overall silica-to-alumina mole ratio below about 6.0 using an aqueous solution of a fluorosilicate salt.

28. The process defined in claim 24 wherein said Y zeolite is prepared by a method comprising the steps of:
 (1) calcining an ammonium-exchanged zeolite Y containing between about 0.6 and 5 weight percent sodium, calculated as $Na_2O$ at a temperature between about 600° and 1650° F. in contact with water vapor for a sufficient time to substantially reduce the unit cell size of said zeolite and bring it to a value between about 24.40 and 24.64 angstroms; and
 (2) subjecting the calcined zeolite to further ammonium ion exchange under conditions such that the sodium content of the zeolite is reduced below about 0.6 weight percent, calculated as $Na_2O$.

29. The process defined in claim 24 wherein said cracking component is a Y zeolite.

30. The process defined in claim 24 wherein said product hydrocarbon comprises a gasoline fraction having a boiling range from about 50? F to about 185? F. or from about 185? F. to about 400? F.

31. The process defined in claim 24 wherein said hydrotreated feedstock contains organonitrogen compounds in a concentration less than about 500 ppmw and organosulfur compounds in a concentration less than about 100 ppmw.

32. The process defined in claim 24 wherein said catalyst comprises a greater weight percent of said niobium component, calculated as the pentoxide, than said molybdenum or tungsten component, calculated as the trioxide.

* * * * *

UNITED STATES PATENT AND TRADEMARK OFFICE
CERTIFICATE OF CORRECTION

PATENT NO. : 4,871,445

DATED : October 3, 1989

INVENTOR(S) : Jeffery W. Koepke and Suheil F. Abdo

It is certified that error appears in the above-identified patent and that said Letters Patent is hereby corrected as shown below:

Column 13, line 48, after "Al" in the formula insert $--_2O_3$ :--.

Column 13, line 60, change "650°" to --1650°--.

Column 14, line 57, change "650? F." to --650° F.--.

Column 14, line 58, change "900? F." to --900° F.--

Column 14, line 67, change "alumina" to --aluminas--.

Column 16, line 11, change "50? F." to --50° F.-- and change "185? F." to --185° F.--

Column 16, line 12, change "185? F." to --185° F.-- and change "400? F." to --400° F.--.

Signed and Sealed this

Fifteenth Day of January, 1991

*Attest:*

HARRY F. MANBECK, JR.

*Attesting Officer*    Commissioner of Patents and Trademarks